US007377028B2

(12) United States Patent
Hasircoglu et al.

(10) Patent No.: US 7,377,028 B2
(45) Date of Patent: May 27, 2008

(54) ELECTRICAL CONNECTOR INSERTION AND REMOVAL TOOL

(75) Inventors: Alexander William Hasircoglu, Columbia, PA (US); James Lee Fedder, Etters, PA (US)

(73) Assignee: Tyco Electronics Corporation, Middletown, PA (US)

( * ) Notice: Subject to any disclaimer, the term of this patent is extended or adjusted under 35 U.S.C. 154(b) by 371 days.

(21) Appl. No.: 10/666,905

(22) Filed: Sep. 19, 2003

(65) Prior Publication Data

US 2005/0060878 A1 Mar. 24, 2005

(51) Int. Cl.
*B23P 19/00* (2006.01)

(52) U.S. Cl. ............................ 29/741; 29/739; 29/740; 29/757; 29/758; 29/762; 29/832; 29/837; 29/402.03; 29/426.1; 901/39

(58) Field of Classification Search .................. 29/832, 29/837, 402.11, 402.06, 402.03, 426.1, 739, 29/740, 741, 747, 749, 757, 758, 762; 294/106, 294/115; 901/38-39
See application file for complete search history.

(56) References Cited

U.S. PATENT DOCUMENTS

| | | | | |
|---|---|---|---|---|
| 2,829,371 | A * | 4/1958 | Sittner et al. | 29/33.52 |
| 4,424,625 | A | 1/1984 | Callahan | |
| 5,108,140 | A * | 4/1992 | Bartholet | 294/106 |
| 5,425,169 | A | 6/1995 | Steinman | |
| 6,169,662 | B1 | 1/2001 | Clark | |
| 6,267,604 | B1 | 7/2001 | Mickievicz | |
| 6,505,397 | B1 * | 1/2003 | Mimata et al. | 29/740 |

* cited by examiner

*Primary Examiner*—Rick K Chang

(57) ABSTRACT

A connector insertion and removal tool for an electrical system including a circuit board and at least one electrical connector therefor includes a first portion configured for coupling to a first surface of the circuit board, and a second portion configured for coupling to the first portion. At least one of the first portion and the second portion comprises an actuator adapted for movement toward and away from the circuit board to contact at least a portion of the connector.

11 Claims, 9 Drawing Sheets

ELECTRICAL CONNECTOR INSERTION AND REMOVAL TOOL

BACKGROUND OF THE INVENTION

The invention relates generally to electrical connectors, and, more particularly, to a tool for inserting and removing electrical connectors having a high density of connection pins to a circuit board.

Modern electronic devices, such as server systems for data communications systems, include an array of electrical connectors interconnecting circuit boards and peripheral devices of the system. A primary circuit board, sometimes referred to as a motherboard, often utilizes a number of peripheral circuit boards, sometimes referred to as daughter cards, in operation. Electrical connectors establish communication between the motherboard and the daughter cards, and typically include many pin contacts which are inserted through holes in the motherboard to establish electrical contact therewith.

Due to a large number of pin contacts in a relatively small area, large insertion and extraction forces may be generated when installing the connectors, and proper engagement of the pins of the connector to the motherboard can therefore be difficult. The applied force to overcome the mechanical resistance of the connector to insertion or removal from the motherboard tends to flex or bow the motherboard. Deflection of the motherboard as the connectors are installed makes installation and/or removal of the connectors more difficult, and may compromise the integrity of the electrical connection between the connectors and the motherboard.

Further, once installed to the motherboard, the electrical connectors are difficult to remove from the motherboard for service and maintenance of the system. Consequently, in some systems it has become conventional to take the server system off-line, disassemble the motherboard and daughter cards, and remove the motherboard from the system for service. The motherboard is then taken to a separate location where scopes, tweezers and tools are used to carefully extract and install connectors as desired, and then the motherboard is returned and the server system re-assembled.

Aside from being physically difficult to accomplish, off-site service of the motherboard is undesirable because it requires that the server system be shut down and powered off to dismantle the motherboard. Shutting down a busy server system inconveniences system users and may lead to economic loss.

BRIEF DESCRIPTION OF THE INVENTION

In accordance with an exemplary embodiment, a connector insertion and removal tool for an electrical system including a circuit board and at least one electrical connector therefor is provided. The tool comprises a first portion configured for coupling to a first surface of the circuit board, and a second portion configured for coupling to the first portion, wherein at least one of the first portion and the second portion comprises an actuator adapted for movement toward and away from the circuit board to contact at least a portion of the connector.

Optionally, the motherboard includes a pin aperture field, and the actuator comprises a plurality of extraction pins corresponding to the pin aperture field. At least one board guide pin is provided, and the board guide pin is engaged to the first portion on one side of the circuit board and is engaged to the second portion on the other side of the circuit board. The board guide pin includes a first end having a first threaded portion and a second end having a second threaded portion, with the first and second threaded portions different from one another. Nonconductive sections are situated adjacent the actuator, thereby avoiding a conductive path through the tool. Alignment members are configured to position the electrical connector with respect to the pin aperture field in the motherboard. A positioning plate configured for sliding engagement with a guide track is provided for preliminary alignment of the connector and the motherboard.

According to another exemplary embodiment, a connector insertion and removal tool for an electrical system including a circuit board and at least one electrical connector therefor is provided. The tool comprises a first portion configured for coupling to a first surface of the circuit board and comprising a first actuator. The first actuator is movable toward the circuit board to disengage the connector from the circuit board, and the first actuator is movable away from the circuit board to permit engagement of the connector to the circuit board. A second portion of the tool is configured for coupling to the first portion, and the second portion extends over a second surface of the circuit board opposite the first surface. The second portion comprises a second actuator, and the second actuator is movable toward the circuit board to engage the connector to the circuit board and the actuator block is movable away from the circuit board to permit disengagement of the connector from the circuit board.

According to another exemplary embodiment, a connector insertion and removal tool for an electrical system including a circuit board and at least one electrical connector therefor is provided. The tool comprises a first portion comprising a first plurality of modular blocks having a first pair of stationary alignment blocks configured for coupling to a first surface of the circuit board, a first movable actuator block movable toward the circuit board to disengage the connector from the circuit board and movable away from the circuit board to permit engagement of the connector to the circuit board, and at least one first insulative spacer block to prevent completion of a conductive path through the first portion. A second portion of the tool comprises a second plurality of modular blocks having at least a second pair of stationary alignment blocks configured for coupling to the first pair of alignment blocks, a second movable actuator movable toward the circuit board to engage the connector to the circuit board and movable away from the circuit board to permit disengagement of the connector from the circuit board, and at least one second insulative spacer block to prevent completion of a conductive path through the second portion.

DETAILED DESCRIPTION OF THE INVENTION

Figure 1:
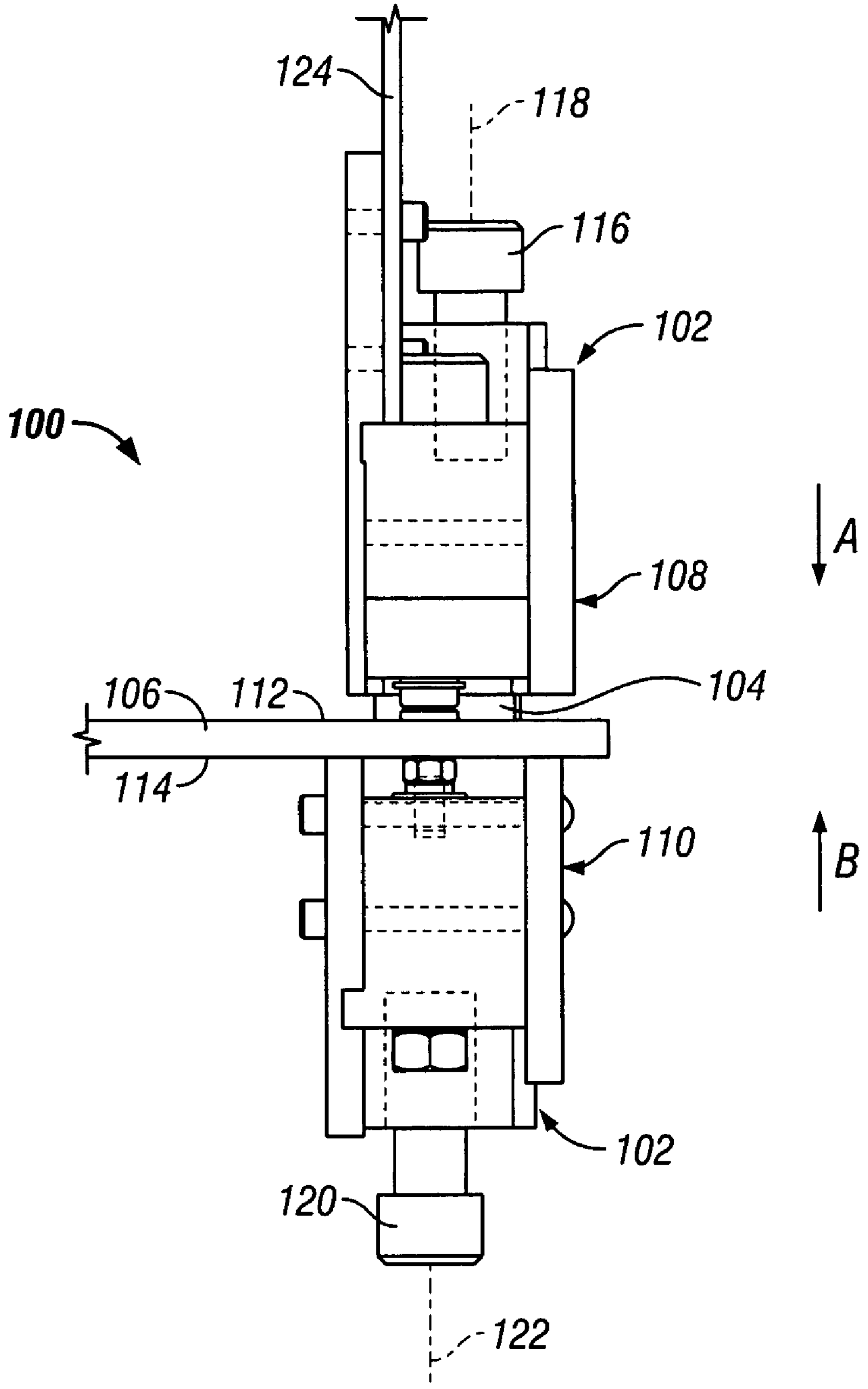
FIG. 1 is a side elevational view of a portion of a server system with a connector insertion and removal tool attached thereto and formed in accordance with an exemplary embodiment of the invention.

FIG. 1 is a side elevational view of a portion of an exemplary server system 100 with an illustrative insertion and removal tool 102 formed in accordance with an exemplary embodiment of the invention. The tool 102 facilitates installation and removal of an electrical connector 104 to and from a motherboard 106. As will be seen below, the tool 102 facilitates on-line servicing and maintenance of the server system 100. Power down and disassembly of the server system 100 is avoided and the server system 100 may still be used during service or maintenance thereof.

As also explained below, the tool 102 supports the motherboard 106 from above and below during installation and removal of the connector 104 and thus prevents flexure or bowing of the board despite relatively large insertion and extraction forces which are generated while engaging or disengaging the connector 104 from the motherboard 106. Reliable and consistent engagement of the connector 104 to the motherboard 106 is therefore provided.

The electrical connector 104 is a known connector establishing electrical connection between the motherboard 106 and a daughter card (not shown) of the server system 100. The connector 104 includes a large number of contact pins (not shown in FIG. 1) which are inserted into a pin aperture field (not shown in FIG. 1) of the motherboard 106 over a relatively small area. The density of the pins of the connector 104 requires a substantial force to engage the connector pins to the motherboard 106, and also to disengage the pins from the motherboard 106.

The tool 102 includes a separate installation mechanism 108 and an extraction mechanism 110 oppositely positioned on a respective top surface 112 and a bottom surface 114 of the motherboard 106. The installation and extraction mechanisms 108 and 110 are positioned substantially perpendicular to the motherboard 106 and align the connector 104 with respect to the motherboard 106 for proper engagement of the connector pins to the pin aperture field in the motherboard 106. Additionally, the installation mechanism 108 and the extraction mechanism 110 support the surfaces 112 and 114 of the motherboard 106 as the connector 104 is installed or removed.

The installation mechanism 108 includes an actuator knob 116 rotatable about an axis 118 to exert a downward force in the direction of arrow A to install the connector 104. The extraction mechanism 110 includes an actuator knob 120 rotatable about an axis 122 to exert an upward force in the direction of arrow B to extract the connector 104 from the motherboard 106. The installation mechanism 108 is affixed to a positioning plate 124 which defines a reference plane for orienting the installation and extraction mechanisms 108 and 110 to one another and to the motherboard 106.

Figure 2:
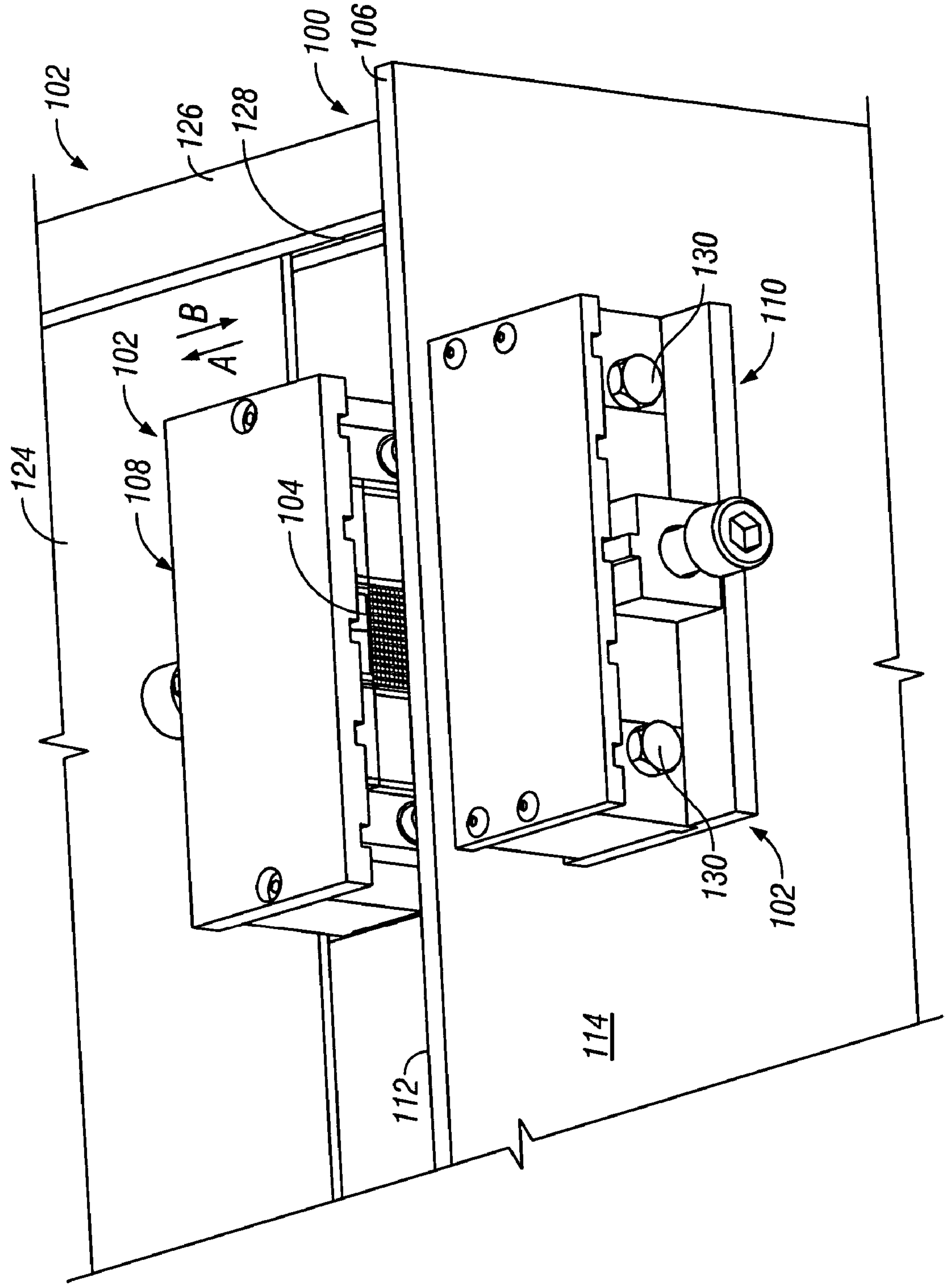
FIG. 2 is a bottom perspective view of the server system with the tool partly attached.

FIG. 2 is a bottom perspective view of the server system 100 with the tool 102 partly attached to the motherboard 106. The installation mechanism 108 carries the connector 104 and extends above the top surface 112 of the motherboard 106, while the extraction mechanism 110 extends below the bottom surface 114 of the motherboard 106. The extraction mechanism 110 is coupled to the motherboard 106 as described below, and the installation mechanism 108 is coupled to the extractor mechanism 110 as explained below.

The installation and extraction mechanisms 108 and 110 are generally aligned with one another for insertion of the connector 104 carried by the installation mechanism 108 to the motherboard 106. As a preliminary alignment feature, the positioning plate 124 is received within guide tracks 126 (only one of which is shown in FIG. 2) which are mounted to the motherboard 106. The guide tracks 126 include respective grooves 128 (only one of which is shown in FIG. 2) therein which receive corresponding edges of the positioning plate 124. The positioning plate 124 is in sliding engagement with the guide tracks 126, and the installation mechanism 108 may therefore be moved in the direction of arrows A and B substantially perpendicular to the motherboard 106 while locating the connector 104 in a reference plane defined by the positioning plate 124.

The motherboard 106 includes a number of guide openings therein, and the extraction mechanism 110 is coupled to the motherboard 106 via alignment members 130 having interior threads which engage respective board guide pins (not shown in FIG. 2) fastened to the motherboard 106 via pre-existing guide openings in the motherboard. The installation mechanism 108 is coupled to the board guide pins in the manner explained below, and as the installation mechanism 108 is coupled to the board guide pins to further align the connector 104 with the motherboard 106 such that the pins of the connector 104 are aligned with the apertures of the pin field in the motherboard 106.

Figure 3:
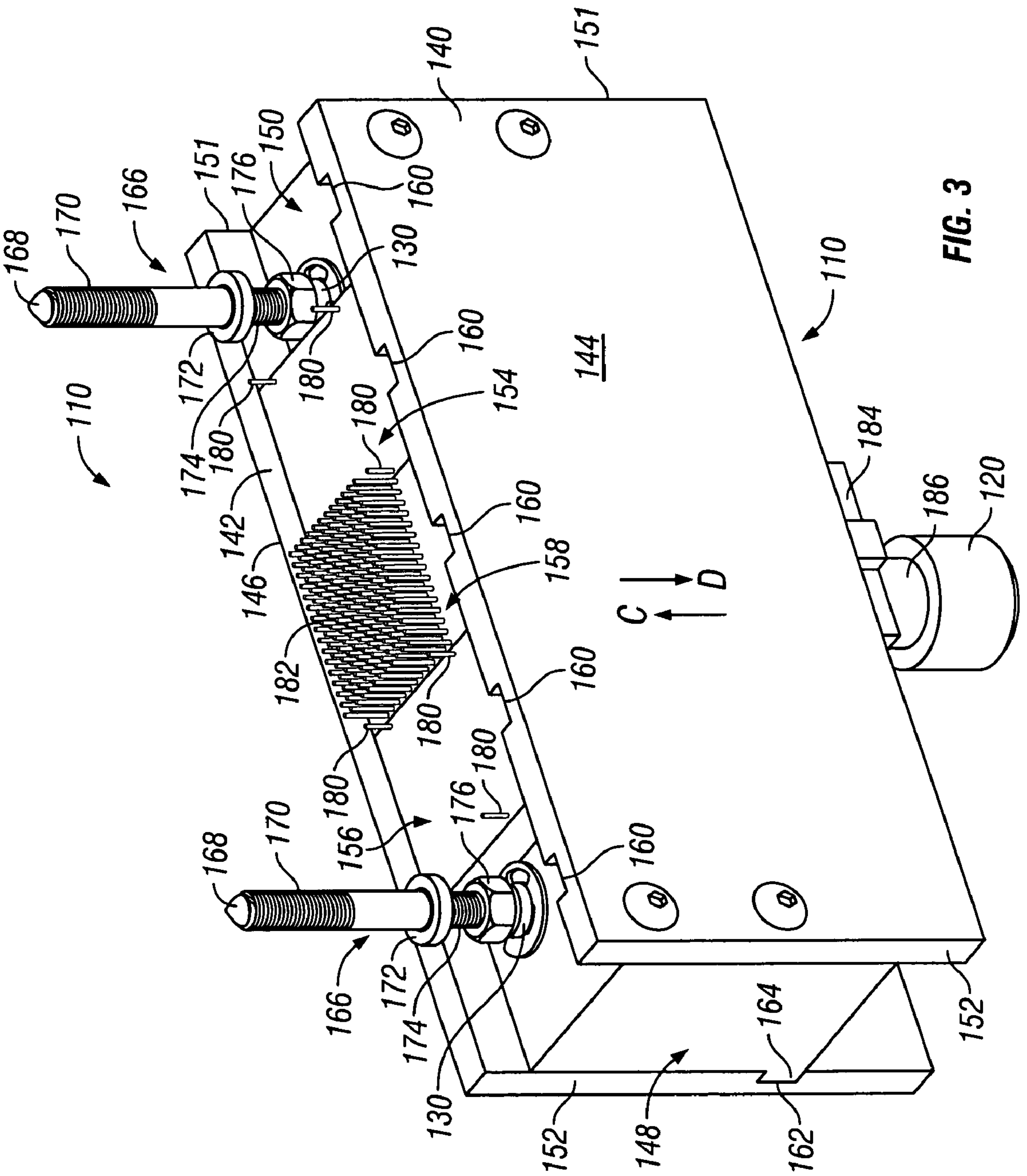
FIG. 3 is a perspective view of an extractor mechanism of the tool shown in FIGS. 1 and 2.

FIG. 3 is a perspective view of the extractor mechanism 110 including substantially rectangular support plates 140 and 142 defining front and rear faces 144 and 146 of the extractor mechanism 110, and a number of aligned modular blocks extending between the support plates 140 and 142. In an exemplary embodiment, the modular blocks include alignment blocks 148 and 150 adjacent each lateral edge 151 and 152 of the support plates 140 and 142. Insulative spacer blocks 154 and 156 extend adjacent the alignment blocks 148 and 150, and an extractor block 158 extends between the spacer blocks 154 and 156. The front support plate 140 includes a number of substantially vertical channels 160 therein which horizontally locate the blocks 148, 150, 154, 156 and 158 in relation to the support plate 140 and to one another. The rear support plate 142 includes a substantially horizontal channel 162 which receives a ridge 164 of each of the modular blocks 148, 150, 154, 156 and 158 to vertically locate the blocks in relation to the support plate 142 and to one another.

The order or position of the modular blocks 148, 150, 154, 156 and 158 in relation to one another may be varied as desired or as necessary to accommodate placement or removal of the connector 104 in different locations on the motherboard 106. In addition, it is understood that greater or fewer modular blocks may be employed in alternative embodiments of the invention.

In an exemplary embodiment, the alignment blocks 148 and 150 are adapted to engage board guide pins 166 which in an exemplary embodiment are secured to the motherboard 106. The board guide pins 166 are employed by the tool 102 to secure the installation mechanism 108 (shown in FIGS. 1 and 2) to the extractor mechanism 110 to one another on the opposed sides of the motherboard 106. In an illustrative embodiment, the board guide pins 166 include a tapered leading edge 168 at one end thereof, a first threaded portion 170 adjacent the leading edge 168, a stop ring 172 adjacent the first threaded portion 170, a spacer section 174 adjacent the stop ring 172, and a second threaded portion adjacent the spacer section 174 at the other end of the board guide pins 166 (not shown in FIG. 3). The second threaded portion of each guide pin 166 extends into a bore (not shown in FIG. 3) in each respective alignment block 148 and 150, and the second threaded portion is secured to the alignment blocks 148 and 150 via tubular retention members 130 having internal threads therein.

A nut 176 secures the board guide pins 166 to the motherboard 106 (shown in FIGS. 1 and 2). The spacer section 174 extends between the nut 176 and the stop ring 172 of each guide pin 166, and the spacer section 174 extends for an axial length approximately equal to the thickness of the motherboard 106 (shown in FIGS. 1 and 2). The stop ring 172 abuts the top surface 112 (shown in FIGS. 1 and 2) of the motherboard 106 and forms a seat for the installation mechanism 108 (shown in FIGS. 1 and 2). The first threaded portion 170 engages the installation mechanism 108 as described further below and forms a guide surface for alignment of the installation mechanism 108 as further described below.

The spacer blocks 154 and 156 are substantially rectangular and include alignment pins 180 adjacent each of the corners of the spacer blocks 154 and 156. The alignment pins 180 extend into guide holes in the motherboard 106 and further serve to locate the extractor mechanism 110 in proper position relative to the motherboard 106 and the installation mechanism 108.

The extractor block 158 includes a plurality of extractor pins 182 extending upward therefrom, and each of the extractor pins 182 corresponds to one of the apertures of the pin field for the connector 104 (shown in FIGS. 1 and 2). The extractor block 158 is coupled to an actuator block 184 via an actuator element 186. The actuator block 184 is mounted stationary to the support plate 142 via the channel 162, and the actuator element 186 extends through the actuator block 184 and into the extractor block 158. The actuator element 186 is threaded within the actuator block 184 such that when the actuator knob 120 is turned, the actuator element 186 is rotated. Depending upon the direction of rotation, the threaded actuator element 186 is advanced upward in the direction of arrow C within the actuator block 184 or advanced downward in the direction of arrow D within the actuator block 184. As the actuator element 186 is moved upward or downward within the actuator block 184, the extractor 158 block is likewise moved upward or downward within extractor mechanism 110. Thus, by turning the actuator knob 120, the extractor pins 182 may be moved upward to remove a connector 104 (shown in FIGS. 1 and 2) from the motherboard 106 (shown in FIGS. 1 and 2) or downward to provide a clearance to permit the connector 104 to be installed to the motherboard 106.

Figure 4:
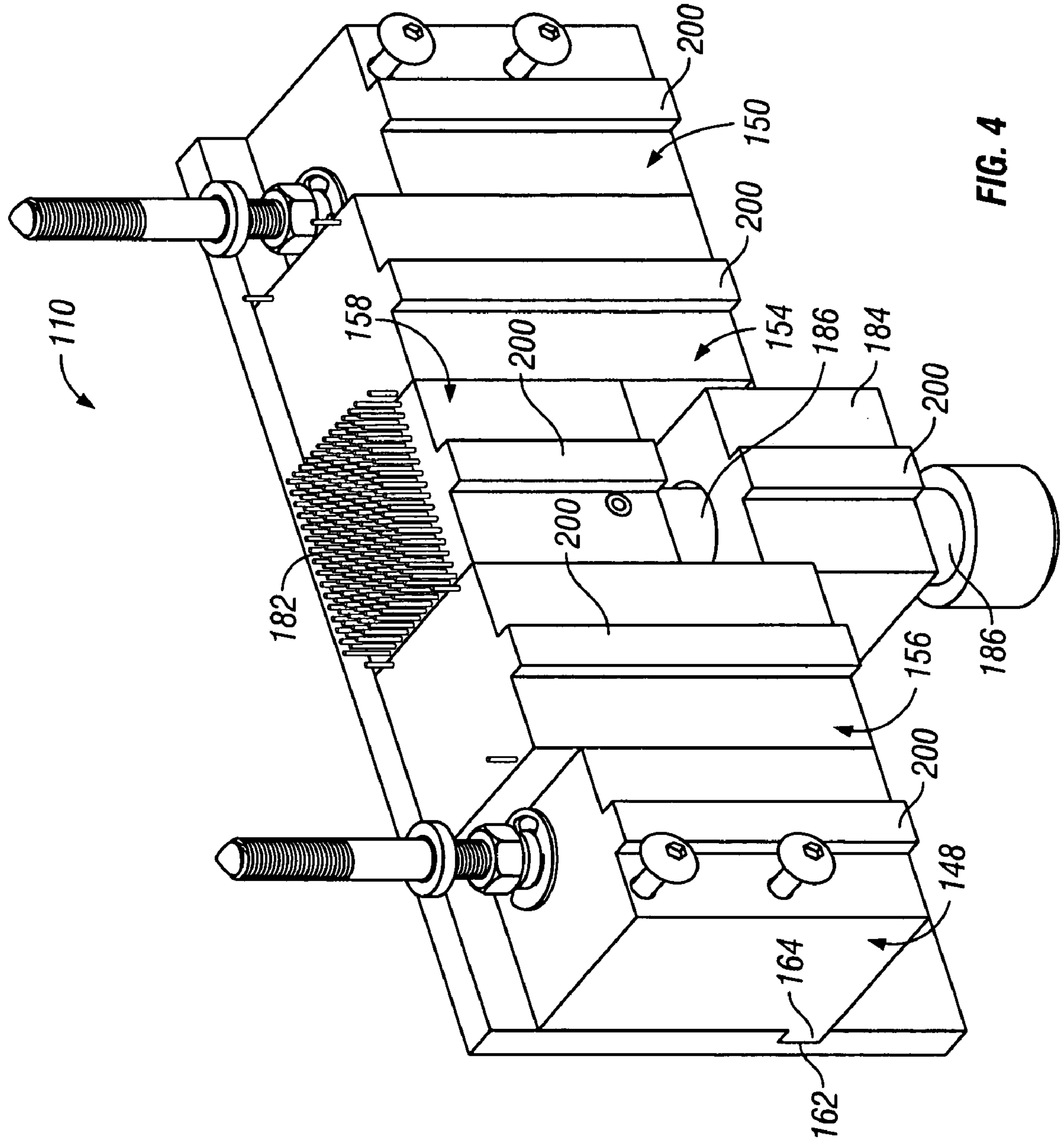
FIG. 4 is a perspective view of the extractor mechanism with parts removed.

FIG. 4 illustrates the extractor mechanism 110 with the front support plate 140 removed. Each of the blocks 148, 150, 154, 156 and 158 and 184 include a vertical rib 200 which is received in a respective channel 160 (shown in FIG. 3) of the support plate 140. Additionally, each of the blocks 148, 150, 154, 156 and 184 include a horizontal rib 164 extending in a horizontal channel 162 in the rear support plate 142, thereby locating the blocks 148, 150, 154, 156 and 184 in a stationary position relative to the support plates 140 and 142. The extractor block 158, however, is not horizontally constrained between the plates 140 and 142, and therefore is free to move vertically between the support plates 140 and 142. The actuator element 186 extends through the actuator block 184 and into the extractor block 158.

In an exemplary embodiment, the alignment blocks 148 and 150, the spacer blocks 154 and 156, and the actuator block 184 are fabricated from a nonconductive material, such as a known ceramic material, to avoid creation of a undesirable current path through the extractor mechanism 110 as it engages the pin field of the motherboard 106. The extractor block 158 is fabricated from a high strength material such as steel to provide the extractor pins 182 with adequate structural strength to dislodge the connector 104 (shown in FIGS. 1 and 2) from the motherboard 106. The support plates 140 and 142 are fabricated from metal in an exemplary embodiment. It is recognized, however, that a variety of materials, conductive and non-conductive, may be employed to fabricate the modular blocks and support plates for the extractor mechanism 110.

In addition, the order or position of the modular blocks 148, 150, 154, 156, 158, and 184 in relation to one another may be varied as desired or as necessary to accommodate placement or removal of the connector 104 in different locations on the motherboard 106. In addition, it is understood that greater or fewer modular blocks may be employed in alternative embodiments of the invention.

Figure 5:
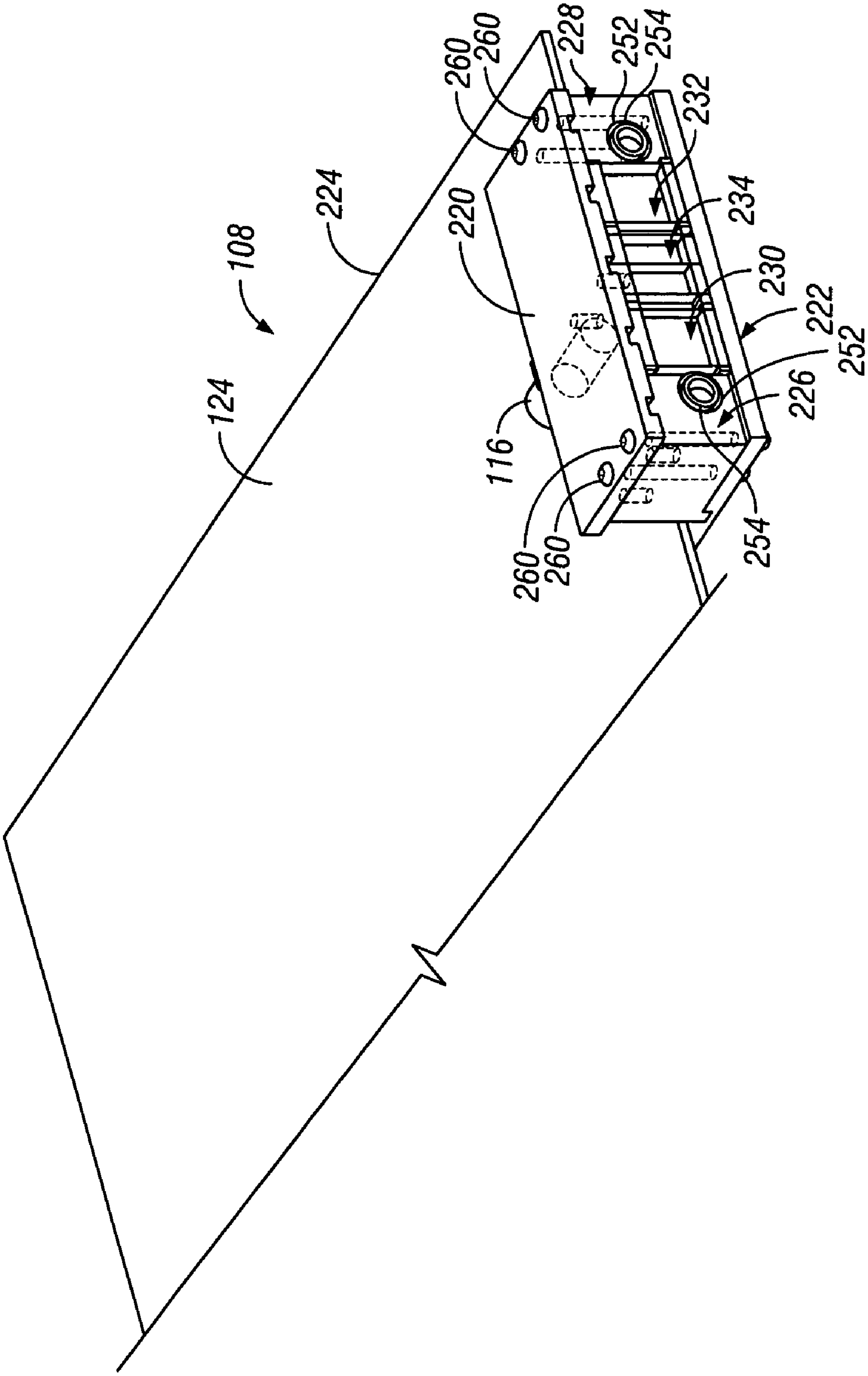
FIG. 5 is a bottom perspective view of an installation mechanism of the tool shown in FIGS. 1 and 2.
Figure 6:
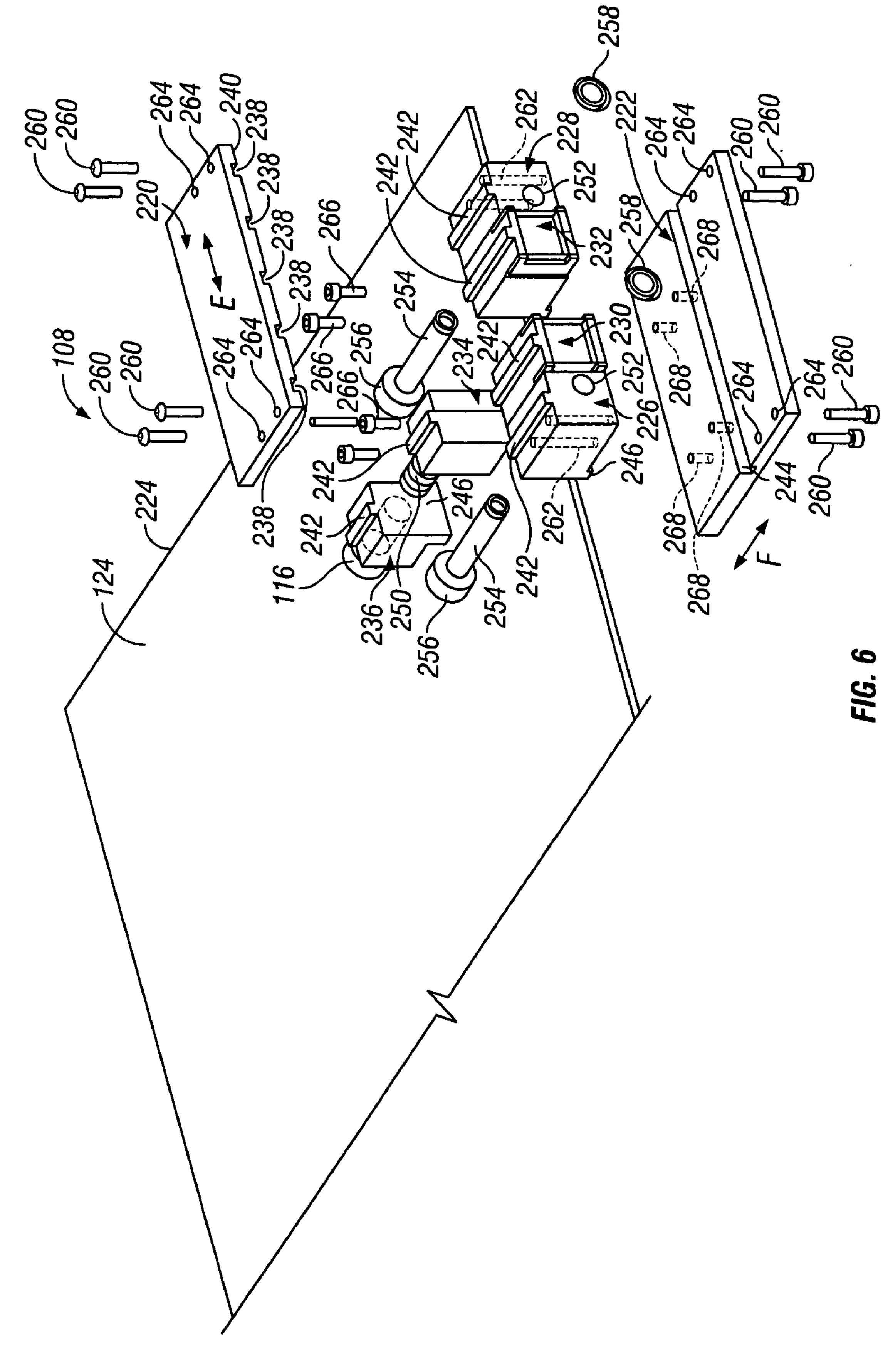
FIG. 6 is an exploded view of the installation mechanism.

FIGS. 5 and 6 illustrate the installation mechanism 108 in respective assembled and exploded views. The installation mechanism 108 includes a front support plate 220, a rear support plate 222, a plurality of modular blocks between the front and rear support plates 220 and 222, and a positioning plate 124 coupled to the rear support plate 222. Opposite side edges 224 of the positioning plate 124 are received in grooves 128 (shown in FIG. 2) of the guide tracks 126 (also shown in FIG. 2) for preliminary alignment of the installation mechanism 108 with respect to the motherboard 106.

In an exemplary embodiment the modular blocks of the installation mechanism 108 include alignment blocks 226 and 228 adjacent opposite lateral sides of the support plates 220 and 222, insulative spacer blocks 230 and 232 adjacent the respective alignment blocks 226 and 228, an installation block 234 between the alignment blocks 230 and 232, and an actuator block 236 vertically aligned with the installation block 234.

The front support plate 220 includes a plurality of grooves or channels 238 extending into a rear face 240 of the front support plate 220. Each of the blocks 226, 228, 230, 232, 234, and 236 include ribs or ridges 242 which are received in the channels 238 and serve to locate the blocks in a direction of arrow E (FIG. 6) substantially perpendicular to the channels 238. The rear support plate 222 includes a longitudinal groove or channel 244 therein which extends transversely to the grooves 238 of the front support plate 220. Each of the blocks 226, 228, 230, 232 and 236 include ribs or ridges 246 which are received in the channel 244 and serve to locate the blocks 226, 228, 230, 232 and 236 in a direction of arrow F (FIG. 6) substantially perpendicular to the channel 244. That is, the blocks 226, 228, 230, 232 and 236 are restrained from horizontal movement in the direction of arrow E by the ridges 242 in the channels 238 of the front support plate 220, and the blocks 226, 228, 230, 232 and 236 are restrained from vertical movement in the direction of arrow F by the ridges 246 in the channel 244 of the rear support plate 222. The blocks 226, 228, 230, 232 and 236 are therefore mounted stationary to the support plates 220 and 222.

The installation block 234, however, is restrained from movement only in the direction of arrow E by the ridge 242. The installation block 234 is not restrained in the direction of arrow F, and thus is free to move vertically in the direction of arrow F to install a connector 104 (shown in FIGS. 1 and 2).

The installation block 234 is coupled to the actuator block 236 via an actuator element 250. The actuator block 236 is mounted stationary to the support plate 222 via the channel 244 and the rib 246, and the actuator element 250 extends through the actuator block 236 and into the installation block 234. The actuator element 250 is threaded within the actuator block 236 such that when the actuator knob 116 is turned, the actuator element 250 is rotated. Depending upon the direction of rotation, the threaded actuator element 250 is advanced upward or downward in the direction of arrow F within the actuator block 236. As the actuator element 250 is moved upward or downward within the actuator block 236, the installation block 234 is likewise moved upward or downward within the installation mechanism 108. Thus, by turning the actuator knob 116, the installation block 234 may be moved downward toward the motherboard 106 (shown in FIGS. 1 and 2) to install a connector 104 (shown in FIGS. 1 and 2) thereto. By turning the actuator knob 116 in an opposite direction, the installation block 234 may be move upward and away from the motherboard 106 to provide a clearance to permit the connector 104 to be removed from the motherboard 106.

The alignment blocks 226 and 228 each include longitudinal bores 252 therethrough, and tubular alignment members 254 are extended through the bores 252. The alignment members 254 include a longitudinal bore therein having a threaded interior, and alignment knobs 256 extend from one end of the respective member 254. Lock washers 258 couple the alignment members 254 to the alignment blocks 226 and 228 at an end opposite the alignment knobs 256. When the alignment knobs 256 are turned, the alignment members 254 receive and engage the board guide pins 166 (shown in FIGS. 3 and 4) to align the installation mechanism 108 with respect to each of the extractor mechanism 110 (shown in FIGS. 3 and 4) and the motherboard 106 (shown in FIGS. 1 and 2).

The front and rear support plates 220 and 222 are coupled to the alignment blocks 226 and 228 via known fastener elements 260, such as screws, extending into mounting bores 262 in the alignment blocks 226 and 228 and mounting apertures 264 in the respective support plates 220 and 222. The positioning plate 124 is mounted to the rear support plate 222 via known fastener elements 266, such as screws, coupled to mounting bores 268 in the support plate 222 via threaded engagement. It is understood that other known fasteners may be employed in various embodiments of the invention to secure the support plates 220 and 222 to the modular blocks and to secure the positioning plate 124 to the installation mechanism 108.

In an exemplary embodiment, the alignment blocks 226 and 228, the spacer blocks 230 and 232, and the actuator block 236 are fabricated from a nonconductive material, such as a known ceramic material, to avoid creation of a undesirable current path through the installation mechanism 108 as it engages the connector 104 to the motherboard 106. The installation block 234 is fabricated from a high strength material such as steel to provide adequate structural strength to insert the connector pins of the connector 104 (shown in FIGS. 1 and 2) into the motherboard 106. The support plates 220 and 222 are fabricated from metal in an exemplary embodiment. It is recognized, however, that a variety of materials, conductive and non-conductive, may be employed to fabricate the modular blocks and support plates for the installation mechanism 108.

In addition, the order or position of the modular blocks 226, 228, 230, 232, 234, and 236 in relation to one another may be varied as desired or as necessary to accommodate placement or removal of the connector 104 in different locations on the motherboard 106. In addition, it is understood that greater or fewer modular blocks may be employed in alternative embodiments of the invention.

Figure 7:
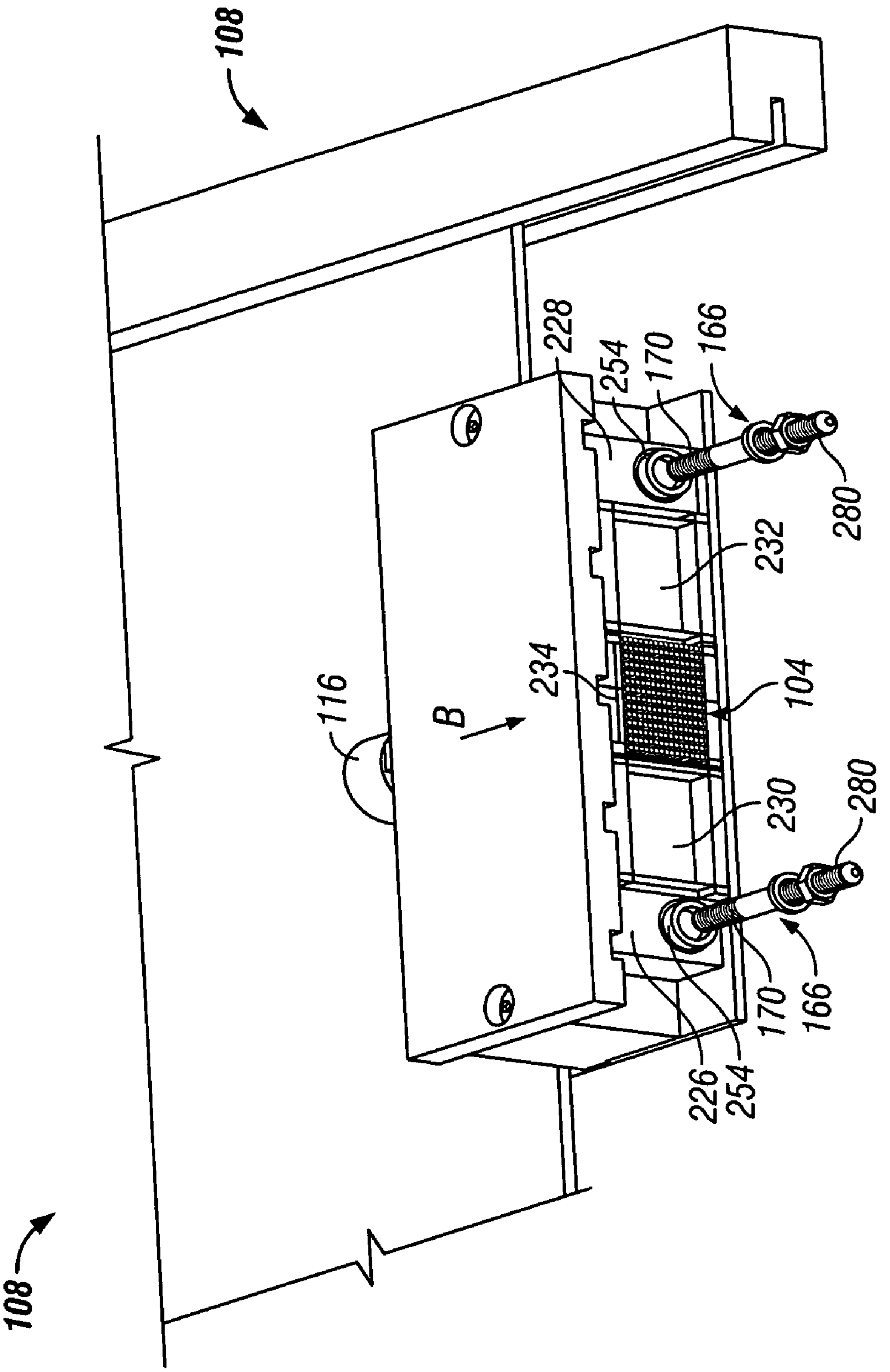
FIG. 7 is a bottom perspective view of the tool shown in FIGS. 1 and 2 with parts removed.

FIG. 7 is a bottom perspective view of the installation mechanism 108 illustrating the board guide pins 166 positioned for insertion into the alignment members 254 extending through the alignment blocks 226 and 228. As illustrated in FIG. 7, the interior of the alignment members 254 is threaded, and the first threaded portion 170 of the board guide pins 166 are received in the respective alignment members 254. As will be explained further below, however, the first threaded portion 170 of the board guide pins 166 is modified so that the first threaded portion 170 does not completely engage the threads of the alignment members. Rather, the first threaded portion 170 forms a guide surface within the alignment members 254 for rather precise positioning of the installation mechanism 108 relative to the motherboard 106. As the alignment knobs 256 (shown in FIG. 6) of the alignment members 254 are turned as the installation mechanism 108 is installed, the first threaded portion 170 and the tapered leading edges 168 of the board guide pins 166 direct the installation mechanism 108 over the board guide pins 166 toward a desired position in substantial alignment with the motherboard for insertion or removal of a connector 104.

A second threaded portion 280 of each guide pin 166 is received in the alignment blocks 148 and 150 (shown in FIG. 4) and is secured to interior threads of the alignment members 130 (shown in FIG. 2) therein.

In an illustrative embodiment, the first threaded portion 170 on one end of the board guide pins 166 is threaded differently than the second threaded portion 280 on the opposite end of each board guide pin 166. More specifically, in one embodiment, the first threaded portion 170 of each board guide pins 166 is a ¼ 20 UNC thread, and the second threaded portion 280 of the guide pin 166 is an M5 thread. Approximately one half of the threads on the first threaded portion 170 is removed or shaved from the mounting pins to prevent the first threaded portion 170 from engaging the threads of the alignment members 254 (shown in FIGS. 5 and 6) of the installation mechanism 108.

While one exemplary embodiment of a guide pin 166 has been described with particular threads, it is recognized that other types of threads may be used in alternative embodiments. It is further understood and the first threaded portion 170 and the second threaded portion 280 need not be threaded differently in alternative embodiments of the invention.

The spacer blocks 230 and 232 are positioned alongside the alignment blocks 226 and 228, and the installation block 234 carries the connector 104 between the spacer blocks 226 and 228. The installation block 234 is in a retracted position providing a clearance for the connector 104 between the spacer blocks 230 and 232, and when the connector 104 is appropriately positioned with respect to the motherboard 106 (shown in FIGS. 1 and 2), the actuator knob 116 may be turned to move the installation block 234 downward in the direction of arrow B and toward the motherboard 106 to install the connector 104.

Figure 8:
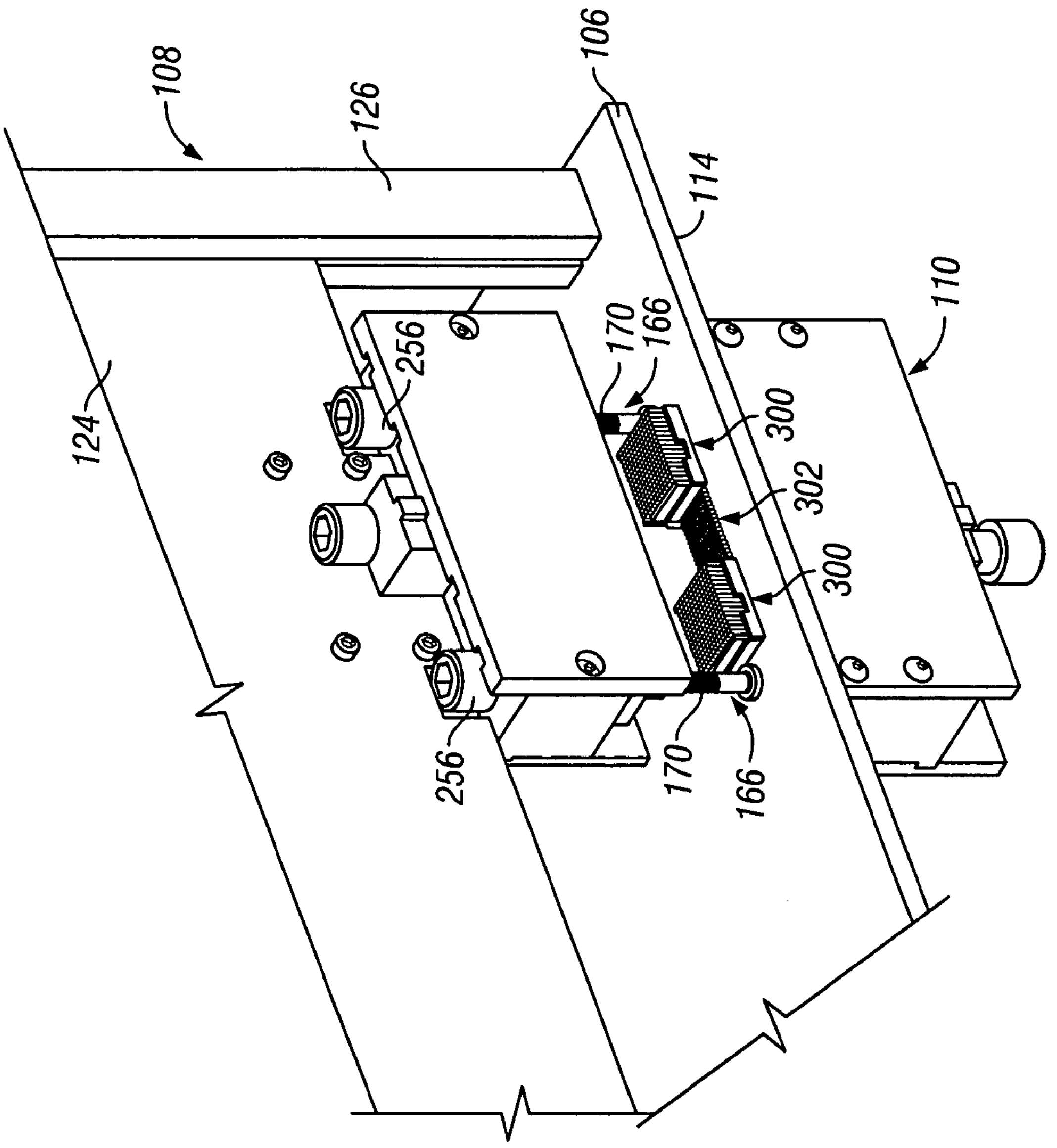
FIG. 8 is a perspective view of the tool shown in FIGS. 1 and 2 being coupled to the server system.

FIG. 8 is a perspective view the motherboard 106 with the extractor mechanism 110 mounted to the bottom surface 114. The installation mechanism 108 is in a preliminary alignment position with the positioning plate 124 slidably mounted to the guide tracks 126, and the alignment blocks 226 and 228 (shown in FIGS. 5-7) of the installation mechanism 108 are in general alignment with the board guide pins 166. The tapered leading edges 168 (shown in FIG. 3) of the board guide pins 166 are received in the alignment members 254 (shown in FIGS. 5-7) of the alignment blocks 226 and 228, and to the extent any misalignment of the alignment blocks 226 and 228 and the board guide pins 166 may exist, the tapered leading edges 168 of the guide pins guide 166 the alignment blocks 226 and 228 into alignment with the board guide pins 166. By turning the alignment knobs 256, the interior threads of the alignment members 254 engage the first threaded portion 170 of the board guide pins 166 and the installation mechanism 108 may be clamped down on the board guide pins 166.

A pair of connectors 300 are shown mounted to the motherboard 106, and a pin aperture field 302 is formed into the motherboard 106 to receive the pins of the connector 104 (shown in FIGS. 1, 2 and 7) which is carried by the installation block 234 (shown in FIGS. 6 and 7) of the installation mechanism 108. The connectors 300 are similar to the connector 104 and may be removed and replaced in a similar fashion as the connector 104. The modular blocks of the installation and removal mechanisms 108 and 110 may be rearranged as described above to insert or remove one of the connectors 300 which are differently positioned than the connector 104.

Figure 9:
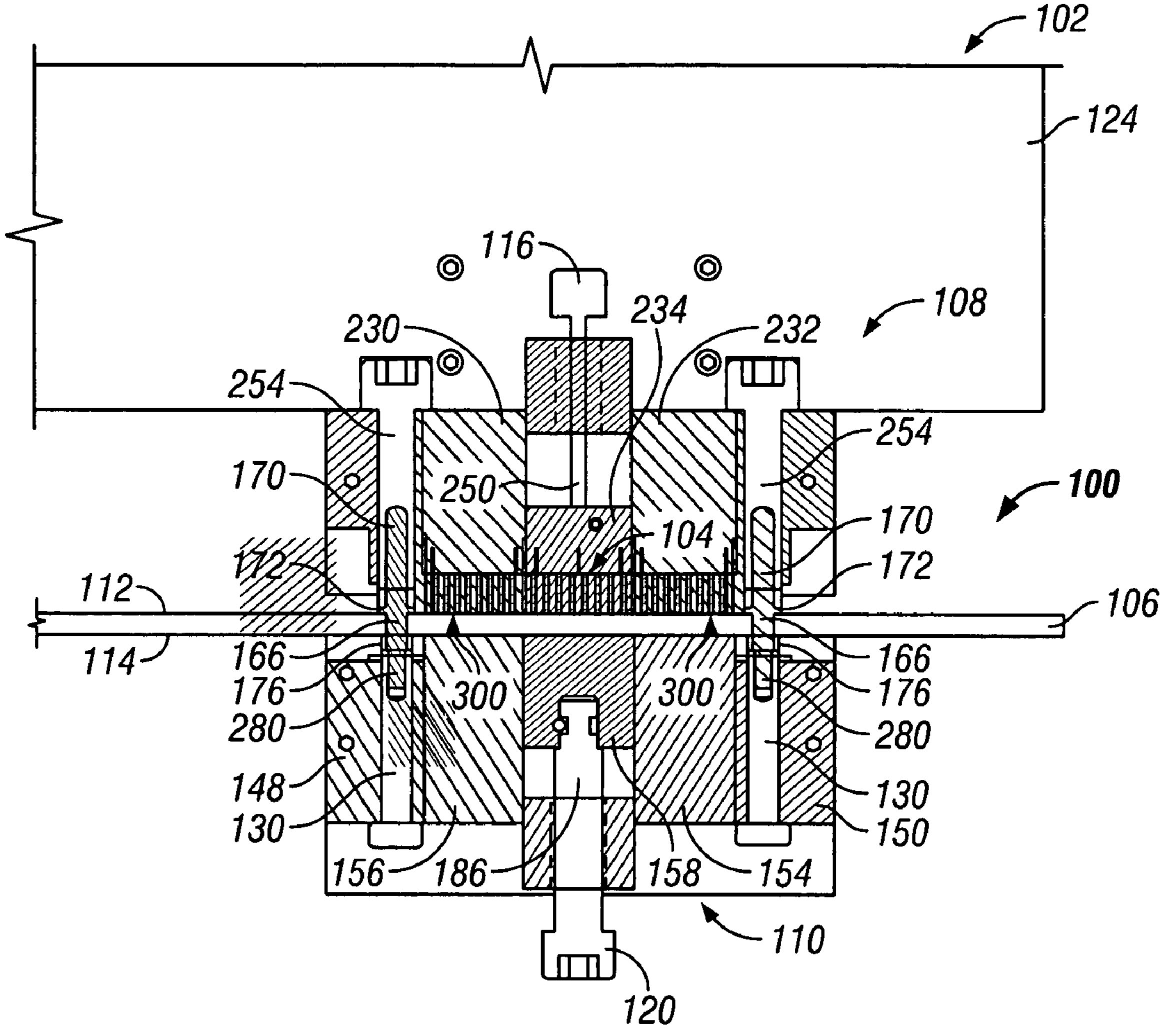
FIG. 9 is a cross sectional view of the tool shown in FIGS. 1 and 2 coupled to the server system.

FIG. 9 illustrates the insertion and removal tool 102 in a final position for installation or removal of the connector 104 between the connectors 300 on the motherboard 106.

The board guide pins 166 are inserted through guide openings in the motherboard 106, and the stop rings 172 of the board guide pins 166 are seated upon the top surface 112 of the motherboard 106. The board guide pins 166 are secured to the lower surface 114 of the motherboard 106 via the nuts 176. The second threaded portions 280 of the board guide pins 166 are engaged to interior threads of the alignment members 130 of the extraction mechanism 110. The alignment blocks 148 and 150 of the extractor mechanism 110 are thereby secured to the motherboard 106.

The first threaded portions 170 of the board guide pins 166 are received in the alignment members 254 and guided by the interior threads of the alignment members 254 of the installation mechanism 108, thereby securing the alignment blocks 226 and 228 of the installation mechanism 108 to the board guide pins 166 and to the extractor mechanism 110. In this position, the pins of the connector 104 are generally aligned with the pin field 302 (shown in FIG. 8) of the motherboard 106.

The spacer blocks 154 and 156 of the extractor mechanism 110 contact the lower surface 114 of the motherboard 106, and the spacer blocks 230 and 232 of the installation mechanism 108 contact the top surfaces of the connectors 300. Thus, the motherboard 106 is effectively clamped from above and below to prevent flexing or deflection of the motherboard 106 as the connector 104 is installed or removed. As the spacer blocks 154, 156, 230 and 232 are nonconductive in an exemplary embodiment, a current path through the tool 102 is avoided, and the connector 104 may be installed or removed while the motherboard 106 is on-line and fully energized. Conventional shut down and disassembly of the server system 100 may therefore be avoided.

Once the connector 104 is correctly aligned with respect to the motherboard 106, the actuator elements 250 and 186 of the installation mechanism 108 and the extraction mechanism 110 may be manipulated by turning the respective actuator knobs 116 and 120 to move the installation block 234 and the extractor block 158 toward and away from the motherboard 106 as desired to remove or install the connector 104.

When the installation block 234 is moved upward from the motherboard 106 to provide a clearance for the connector 104 and the extractor block 158 is moved toward the motherboard 106, the extractor pins 182 (shown in FIGS. 3 and 4) of the extractor block 158 are inserted through the pin field 302 (shown in FIG. 8) from below the lower surface 114. As the extractor pins 182 are inserted through the pin field 302, the contact pins of the connector 104 are dislodged from the motherboard 106, and the connector 104 is pushed upward into the installation block 234 between the spacer blocks 230 and 232 of the installation mechanism 108. By releasing the first threaded portions 170 of the board guide pins 166 from the alignment members 254 and sliding the positioning plate upward and away from the motherboard 106, the connector 104 is also removed upward and away from the motherboard 106.

On the other hand. when the extractor block 158 is moved downward and away from the motherboard 106 to provide a clearance for the pins of the connector 104 and the installation block 234 is moved toward the motherboard 106, the installation block 234 presses downward on the connector 104 and inserts the pins of the connector 104 into the pin field 302 (shown in FIG. 8) and into the motherboard 106 from above the top surface 112. By releasing the first threaded portions 170 of the board guide pins 166 from the alignment members 254 and sliding the positioning plate upward and away from the motherboard 106, the installation mechanism 108 may be moved from the motherboard 106.

Once the installation mechanism 108 is removed, the extractor mechanism 110 may be removed by releasing the second threaded portion 280 of the board guide pins 166 from the alignment members 130 of the extractor mechanism 110. The board guide pins 166 are retained to the motherboard 106 for future employment with the insertion and removal tool 102. It is contemplated, however, that in an alternative embodiment, the board guide pins 166 may be removed by releasing the nuts 176 from the board guide pins 166 beneath the lower surface 114 of the motherboard 106, and pulling the board guide pins 166 through the motherboard 106 from above the top surface 112 of the motherboard 106.

A connector insertion and removal tool 102 is therefore provided which facilitates on-line maintenance and servicing of the server system 100. The tool employs pre-existing guide holes in the motherboard 106 to fasten the tool to the motherboard and to properly align the connector 104 with the motherboard 106, thereby ensuring proper orientation of the connector 104 and reducing an applied force to install the connector. Additionally, the installation and removal mechanisms 108 and 110 support the motherboard 106 and prevents flexing of the board during installation and removal of the connector 104, thereby ensuring a reliable electrical connection between the motherboard 106 and a daughter card. The tool 102 is believed to be easily used and is provided at an economical cost. Servicing and maintenance of the server system 100 is therefore greatly facilitated. Service time for a service tehnician is accordingly saved, and disruption of the server system 100 is minimized.

While the invention has been described in terms of various specific embodiments, those skilled in the art will recognize that the invention can be practiced with modification within the spirit and scope of the claims.

What is claimed is:

1. A connector insertion and removal tool for inserting and removing an electrical connector onto and from a circuit board having opposite first and second surfaces, said tool comprising:

an installation mechanism configured to be positioned proximate the first surface of the circuit board, the installation mechanism being configured to insert the connector onto the first surface of the circuit board such that pins on the connector are inserted into a pin aperture field formed through the circuit board; and an extraction mechanism configured to be positioned proximate the second surface of the circuit board, the extraction mechanism being configured to remove the connector from the first surface of the circuit board, said installation and extraction mechanisms being coupled to one another;

wherein at least one of said installation and extraction mechanisms comprises an actuator adapted for movement toward and away from the circuit board to insert and remove the connector onto and from the circuit board, said actuator comprising a plurality of extraction pins that are configured to align with and extend into the pin aperture field from the second surface toward the first surface of the circuit board, the extraction pins engaging the pins of the connector in the pin aperture field to force the connector from the first surface of the circuit board; wherein said extraction mechanism includes front and rear support plates, said actuator including an actuator element, an actuator block and an extractor block located between the front and rear support plates, the actuator block being held stationary with respect to the front and rear support plates, the actuator element moving the extractor block toward and away from the second surface of the circuit board when the actuator element is rotated, the extractor block including the extraction pins.

2. The tool in accordance with claim 1 wherein said installation mechanism and said actuator include a groove and rib combination extending toward the first surface to guide said actuator toward and away from said the circuit board during insertion of the connector.

3. The tool in accordance with claim 1 wherein at least one of the installation and extraction mechanisms comprises at least one guide pin positioned to extend between the opposite first and second surfaces of the circuit board, said guide pin securing said installation mechanism to the first surface of the circuit board and securing said extraction mechanism to the second surface of the circuit board.

4. The tool in accordance with claim 1 further comprising nonconductive sections situated adjacent said actuator, thereby avoiding a conductive path through said tool.

5. The tool in accordance with claim 1 wherein said extraction mechanism comprises an alignment member configured to position the electrical connector with respect to a pin aperture field in the circuit board.

6. The tool in accordance with claim 1 wherein each of said installation mechanism and said extraction mechanism comprises a plurality of modular blocks mounted on and held stationary with respect to the circuit board, and at least one movable block configured to move toward and away from the circuit board.

7. The tool in accordance with claim 1 wherein at least one said installation mechanism and said extraction mechanism comprises a positioning plate configured for sliding engagement with a guide track.

8. The tool in accordance with claim 1, further comprising a board guide pin that secures the installation and extraction mechanisms to one another with the circuit board supported therebetween, such that the installation and extraction mechanisms prevent flexure of the circuit board while inserting and removing the connector onto and from the circuit board.

9. The tool in accordance with claim 1, wherein the installation and extraction mechanisms engage and support the opposite first and second surfaces of the circuit board.

10. The tool in accordance with claim 1, further comprising guide pins that extend through guide openings in the circuit board, and securing elements threaded on the guide pins to secure the beth-installation and extraction mechanisms to the circuit board.

11. A connector insertion and removal tool for inserting and removing an electrical connector onto and from a circuit board having opposite first and second surfaces, said tool comprising:

an installation mechanism configured to be positioned proximate the first surface of the circuit board, the installation mechanism being configured to insert the connector onto the first surface of the circuit board; and an extraction mechanism configured to be positioned proximate the second surface of the circuit board, the extraction mechanism being configured to remove the connector from the first surface of the circuit board, said installation and extraction mechanisms being coupled to one another;

wherein at least one of said installation and extraction mechanisms comprises an actuator adapted for movement toward and away from the circuit board to insert and remove the connector onto and from the circuit board, said actuator comprising a plurality of extraction pins that are configured to align with a pin aperture field that is included on the second surface of the circuit board, the extraction pins extending into the pin aperture field to force the connector from the first surface of the circuit board, wherein said extraction mechanism includes front and rear support plates and a board guide pin securing said extraction and installation mechanisms to one another, the actuator including an actuator element and an extractor block, the actuator element moving the actuator block toward and away from the second surface of the circuit board when the actuator element is rotated, the actuator block including the extraction pins.

* * * * *